Figures 1, 2:
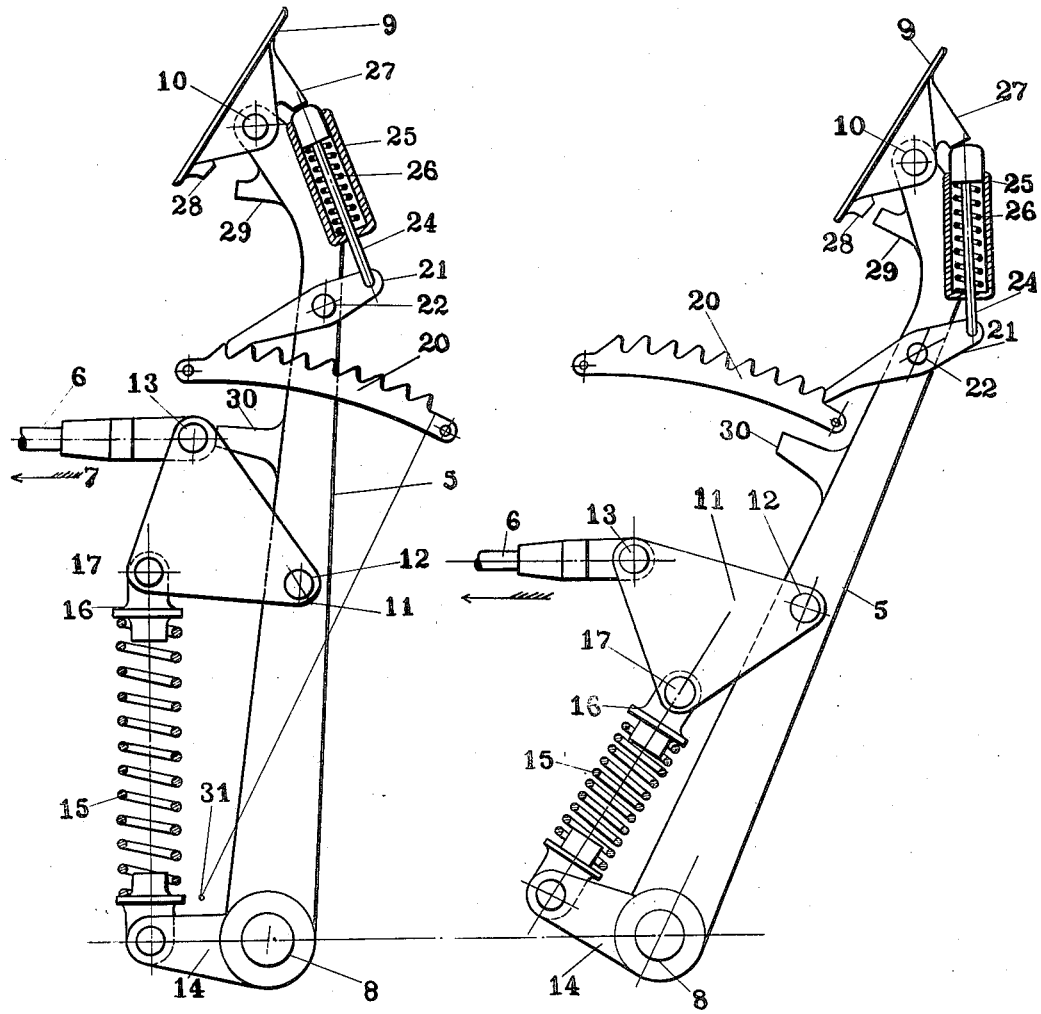

F. D. HOWE.
CONTROLLING DEVICE.
APPLICATION FILED FEB. 1, 1908.

914,277.

Patented Mar. 2, 1909.

WITNESSES:
Robert H. Kammler.
Horace H. Crossman.

INVENTOR.
Frank D. Howe
BY Emery & Booth
his ATTORNEYS

UNITED STATES PATENT OFFICE.

FRANK D. HOWE, OF WALTHAM, MASSACHUSETTS, ASSIGNOR TO WALTHAM MFG. COMPANY, OF WALTHAM, MASSACHUSETTS, A CORPORATION OF MAINE.

CONTROLLING DEVICE.

No. 914,277.      Specification of Letters Patent.      Patented March 2, 1909.

Application filed February 1, 1908. Serial No. 413,781.

*To all whom it may concern:*

Be it known that I, FRANK D. HOWE, a citizen of the United States, residing at Waltham, in the county of Middlesex and State of Massachusetts, have invented an Improvement in Controlling Devices, of which the following description, in connection with the accompanying drawings, is a specification, like numerals on the drawings representing like parts.

This invention relates to controlling devices; and is particularly applicable to foot levers or other controllers such as are used to govern starting and stopping mechanisms, brake mechanisms or the like in motor vehicles, or for analogous purposes in similar connections.

The invention consists in various features which will appear during the course of the succeeding description and will be defined in the appended claims.

The character of the invention may be best understood by reference to a concrete embodiment exhibited in the accompanying drawings for purposes of illustration.

In the drawings, Figure 1 is a side elevation of a practicable construction embodying this invention, showing one selected position thereof; and, Fig. 2 is a side elevation of the same construction showing a second position thereof.

The specific device selected for illustration comprises a foot lever 5 adapted to be used as a controller for starting and stopping mechanism, brake mechanism or the like. The foot lever 5 is connected to the controlled mechanism, through the agency of a link 6; and for purposes of description it is assumed that the active control by the lever is exercised by pulling the link 6 toward the right in Figs. 1 and 2. That is to say the resistance to the lever offered by the controlled mechanism acts as a pull on the link 6 in the direction of the arrow 7. The foot lever 5 is fulcrumed in any practicable manner at 8; and at its upper end has a foot receiving pedal 9 pivoted to the lever 5 at 10 to permit rocking of the pedal to suit the natural position of the operator's foot. The foot lever 5 is connected to the link 6 by a triangular or three-armed link or intermediate member 11 pivoted to the lever 5 at 12 and to said link at 13. The lever 5 has a rigidly connected toe 14; a compression spring 15 is interposed between the toe 14 and an abutment 16 pivoted at 17 to the link 11.

A stationary toothed sector 20, supported in any suitable manner, engages by its teeth and locks a pawl 21 pivoted at 22 upon the foot lever 5. Connected to the tail of the pawl is a plunger 24, appropriately seated in a socket 25 on the foot lever 5 and provided with a compression spring 26, which tends normally to hold the pawl 21 in engagement with the teeth of the sector 20. The upper end of the plunger 24 stands in position to be depressed for disengaging the pawl 21, by a lug 27 on the pedal 9. A second lug on the pedal 9 may abut against a stop 29 on the foot lever 5 to limit the movement of the pedal 9 about its pivot 10.

With the described arrangement if the foot lever 5 be moved from the position of Fig. 1 clockwise toward the position of Fig. 2, it will tend to pull the controlling link 6 toward the right; and if the latter be arrested or meet with material resistance to movement, the action of the foot lever will tend to aline the link 6 with the pivot 12. Under inactive conditions the link pivot 13 may rest against a stop lug 30 on the lever 5; and in that position the resistant force acting upon the link 6 has a certain leverage opposed to that of the lever 5. As the link 6 approaches, however, alinement with the pivot 12 the point of application of the resistant force to the lever 5, approaches nearer to the fulcrum 8 of the latter with a resulting diminution in leverage favorable to said resistant force. Thus if the link 6 be connected with a brake mechanism, for instance, the greater the resistance between the brake and tire, the greater will be the effective leverage favorable to the operator.

The compression spring 15 acting upon the link 11 through the pivot 17 tends to rock the link 11 clockwise on its pivot 12 and thereby to move the controlling link 6 to the right. As the latter approaches alinement with the pivot 12 the compression of the spring 15 is increased with a resultant augmented force opposing the resistance of the controlling link 6. By suitably correlating the various points of application exemplified by the pivots 12, 13 and 17, and spring 15, link 6 and lever 5, any desired relation of pull or leverage may be obtained.

As a result of the above indicated features of construction and arrangement, a relatively slight pressure applied to the pedal 9 will be greatly multiplied as to its ultimate effect upon the controlling link 6. The spring may serve to give a desirable elasticity in the connection between the lever 5 and the controlling link 6, such that variations in the action or movement of one may be compensated for while at the same time the movement of the other may continue unchanged.

It will be observed that the lever 5 when locked by its pawl 21 and the toothed sector 20, may be released by tilting the pedal 9 on its pivot, causing the lug 27 to depress the plunger 24 and rock the pawl 21 out of engagement with the sector teeth. It is preferred that the pedal 9 stand always at an angle convenient to the natural position of the operator's foot, as by being always at the same angle to the horizontal; accordingly, the illustrative mechanism shows the sector 20 constructed on a center 31, offset from the fulcrum 8, about which the pawl pivot 22 moves during the throw of the foot lever 5. The result of this construction is that at the extreme throw of the foot lever shown in Fig. 2, the pawl 21 has been rocked contra-clockwise from its initial position, whereby the plunger 24 is considerably elevated beyond its original position relative to the pedal 9, so as to hold the latter at substantially the same angle which it has when the lever 5 is in its inactive position shown in Fig. 1. It will be observed by comparison of Figs. 1 and 2 that the pedal 9 in both figures occupies substantially the same relation to the natural position of the driver's foot, so that the same movement upon his part would unlock the pawl 22 in either case. The advantage and convenience of this position will be apparent to those familiar with pedal mechanisms.

While the preceding description has sufficiently disclosed a single practicable embodiment of the invention with some of the advantages which may accrue from its use, it is to be understood that said specific embodiment and said advantages have been shown and described merely for purposes of illustration; and the scope of the invention is by no means essentially limited thereto. As will appear to those skilled in the art the invention is susceptible of embodiment in various forms differing from this disclosure but which nevertheless are included in the proper scope of the invention. It is not indispensable that all the features of the invention be used conjointly since they are capable of use separately to advantage.

Claim.

1. In controlling mechanism of the character described, the combination of a main controlling member; a pedal device therefor; locking means for said member; and unlocking means governed by substantially uniform angular position of the pedal device irrespective of the position of said member.

2. In controlling mechanism of the character described, the combination of a main controlling member; a pedal device therefor; locking means for said pedal device; and means to preserve substantially a uniform inclination in the operative position of said pedal device for different positions of said member.

3. In controlling mechanism of the character described, the combination of a controlling lever a pedal device; a locking pawl connected to said lever and operatively connected to said pedal device; a toothed sector to coöperate with said pawl having its geometrical center spaced from the fulcrum of said lever, whereby the pawl changes position relative to the lever in accordance with different positions of the latter.

4. In controlling mechanism of the character described, the combination of a main controlling member; and coöperating locking devices for said member one of which is movable and arranged to engage with the other along a line oblique to the path of movement of the former, whereby one of said members may be given a variable pedal governing action.

5. In controlling mechanism of the character described, the combination of a main controlling member; a pedal device therefor; locking means for said member; and means governed by the locking means to maintain desired adjustment of the pedal device.

6. In controlling mechanism of the character described, the combination of a main controlling member, a connecting member connected to the mechanism to be controlled, and a connecting link device constituting the connecting and power transmitting means between said members, and differentially movable with respect to said connecting member and movable toward and from the point of support of the said main controlling member.

7. In controlling mechanism of the character described, the combination of a main controlling member 5, a link 6, and an intermediate link device, 11, connecting said member 5 and link 6, and movable with relation to the support of said member 5.

8. In controlling mechanism of the character described, the combination of a controlling lever to initiate the operation of the controlling mechanism, a controlling member 6 connected to the mechanism to be controlled, and means operatively connected to said lever and said member and movable with relation to said lever to increase the leverage thereof during the operation of the mechanism.

9. In controlling mechanism of the character described, the combination of a main controlling lever; a controlling link connected to the mechanism to be controlled; and spring controlled means intermediate the same and movable with relation to the lever to increase the leverage thereof.

10. In controlling mechanism of the character described, the combination of a main controlling member, a controlling link connected to the mechanism to be controlled, a member intermediate said main controlling member and said link and adapted to be moved by said main controlling member toward alinement with said link to operate the latter, and auxiliary means to act upon the said intermediate member to oppose said alinement.

11. In controlling mechanism of the character described, the combination of a main controlling member, a controlling link connected to the mechanism to be controlled, a member intermediate said main controlling member and said link and arranged to approach alinement with said link upon movement of said main controlling member, and means to act upon said intermediate member with force increasing as the latter approaches said alinement.

12. In controlling mechanism of the character described, the combination of a main controlling member; a controlling link; spring controlled means intermediate the same; means to lock said member in active position; and unlocking means having uniform angular position for different positions of said member.

13. In controlling mechanism of the character described, the combination of a main controlling member; auxiliary power transmitting means coöperating therewith; pedal means connected to said member; locking means for said member to maintain the action of said auxiliary means and means for unlocking said member by movement of the pedal device while maintaining substantially the same angular position, irrespective of the position of said member.

14. In controlling mechanism of the character described, the combination of a controlling lever to initiate the operation of the controlling mechanism, a controlling member connected to the mechanism to be controlled, and yieldingly supported connecting means for said lever and member and constituting the power transmitting means therebetween.

15. In controlling mechanism of the character described, the combination of a controlling lever, a controlling link connected to the mechanism to be controlled, and means constituting the connecting and power transmitting means between said lever and link and movable with relation to the lever during the application of pressure thereto, to cause the point of application thereto of the resistant force of the said link to move toward and from the fulcrum of the lever, said means being differentially movable with respect to said controlling link.

16. In a controlling mechanism of the character described, the combination of a controlling lever a controlling member connected to the mechanism to be controlled, an intermediate member connecting the same and means for causing said intermediate member to move toward and from the fulcrum of the lever in the operation of said mechanism.

17. In controlling mechanism of the character described, the combination of a controlling lever; a controlling link; an intermediate link connecting the two; the point of connection of the controlling link and the intermediate link being arranged to approach the fulcrum of said lever during operation of the latter.

18. In controlling mechanism of the character described, the combination of a controlling lever; a controlling link; an intermediate link connecting the two; the point of connection of the controlling link and the intermediate link being arranged to approach the fulcrum of said lever; and yielding means to oppose said approach.

19. In controlling mechanism of the character described, the combination of a controlling lever 5 having a toe 14, a link 11 pivoted to the controlling lever, a compression spring 15 interposed between said toe 14 and link 11, a link 6 connected to said link 11 and a pedal device for operating said controlling lever 5.

20. In controlling mechanism of the character described, the combination of a controlling lever 5 having a stop lug 30, a link 11 pivoted to the lever 5 between its fulcrum and said stop lug, said lever having a portion projecting therefrom adjacent its fulcrum, a compression spring 15 interposed between and connected to said portion and said link 11, a link 6 pivotally connected to said link 11, and means for operating said controlling lever 5.

21. In controlling mechanism of the character described, the combination of a main controlling member, a connecting member connected to the mechanism to be controlled, and intermediate connecting and power transmitting means acting to transmit a lesser extent of movement to said connecting member than is imparted to said power transmitting means from said main controlling member.

22. In controlling mechanism of the character described, the combination of a main controlling member, a connecting member connected to the mechanism to be controlled, intermediate connecting and power transmittng means acting to transmit a lesser extent of movement to said connecting member than is imparted to said power transmitting means from said main controlling member, and a yielding medium opposing the movement of said power transmitting means and offering in operation augmented force to the resultant movement of said connecting member.

23. In controlling mechanism of the character described, the combination of a controlling lever, a power transmitting member fulcrumed thereon, a connecting member jointed to said power transmitting member and connected to the mechanism to be controlled, the movement of the controlling lever serving to swing said power transmitting member on its fulcrum and move the connecting member to a different extent than the movement imparted to the power transmitting member, and a spring acting to oppose movement of the power transmitting member on the controlling lever.

In testimony whereof, I have signed my name to this specification, in the presence of two subscribing witnesses.

FRANK D. HOWE.

Witnesses:
LAWRENCE A. JANNEY,
ROBERT H. KAMMLER.